3,297,638
COMPOSITION CONSISTING OF AN ADMIXTURE OF A PHENOL-ALDEHYDE RESIN, AN ALKYL PHENOL - ETHYLENE OXIDE CONDENSATE AND A POLYOXYPROPYLENE-ETHYLENE OXIDE REACTION PRODUCT
Raymond D. Beaulieu, North Wilbraham, Mass., assignor to Monsanto Company, a corporation of Delaware
No Drawing. Filed Apr. 30, 1963, Ser. No. 277,040
5 Claims. (Cl. 260—59)

This invention relates to an improved composition of a phenol-aldehyde resin containing certain nonionic surface active agents and to a fibrous battery separator impregnated with the composition.

Permeable cellulosic fibrous battery separators are used extensively in batteries of either the conventional wet lead-acid type or the so-called "dry charge" lead-acid type. It is necessary that the fibrous structures thereof be protected from attack by the acid employed in the batteries. Therefore, when cellulosic fibrous battery separators are employed, they consist of cellulosic sheets impregnated with a phenol-aldehyde type of resin, which resin, when advanced to the infusible state, protects the fibers of the cellulosic sheet from attack by the acid. In addition, it is necessary that the battery separators absorb or become rewetted by the battery acid rapidly, particularly in the so-called "dry charge" lead-acid type. This is essential so that the electrical resistance of the separator will reach its minimum value, within as short a time as possible, after addition of the battery acid. This requires incorporating a surface active agent with the phenol-aldehyde type of resin. To function properly, however, the surface active agent must allow rapid rewetting of the battery separator by the battery acid, must remain stable at high temperatures and must not leach out with water or with an acid solution.

The resistance of the surface active agent to leaching out by water or by the acid solution is important. If the surface active agent should leach out, it can result in poor negative plate formation when forming the battery. This will, in turn, reduce cell capacity, require higher charge voltages and reduce the useful service life of the battery.

Therefore, it is an object of this invention to provide a composition comprising in admixture a phenol-aldehyde resin and certain surface active agents.

It is another object of this invention to provide an improved fibrous battery separator impregnated with the composition of this invention.

Briefly, the above and other objects of this invention are attained by incorporating with a phenol-aldehyde resin a combination of certain nonionic surface active agents and impregnating permeable cellulosic fibrous sheets therewith to prepare battery separators. The surface active agents employed in combination herein are water-soluble nonionic and water-insoluble nonionic surface active agents.

The following examples are set forth to illustrate more clearly the principle and practice of this invention to those skilled in the art and are not to be construed as limitations on the invention. Unless otherwise stated all parts and percentages are on a weight basis.

EXAMPLE I

Part A

A one-stage water-dilutable phenol-formaldehyde resin, prepared by condensing 1.5 mols of formaldehyde per mol of phenol in the presence of a sodium hydroxide catalyst, having a resin solids content of about 30% with about 70% water, is admixed with about (a) 2% of a surface active agent prepared by the condensation reaction of 10 weight percent of ethylene oxide and 90 weight percent of polyoxypropylene and having a number average molecular weight of 3800 as set forth in U.S. 2,979,528, and (b) 2% of Sterox NJ (Monsanto's trade name for an alkyl phenol-ethylene oxide condensate wherein the alkyl group contains 9 carbon atoms) to form a single phase admixture. The amounts of the surface active agents employed herein are based on the weight of resin solids.

Part B

Part A is repeated except that only 2% of the surface active agent of (a) is employed herein having a number average molecular weight of about 3800. No Sterox NJ is employed herein.

Part C

Part B is repeated except that 4% of the surface active agent of (a) is employed herein.

Part D

Part A is repeated except that only 2% of Sterox NJ is employed herein.

EXAMPLE II

Part A

The compositions of Example I, Parts A, B, C and D are used to separately treat permeable cellulosic fibrous sheets, 6" x 6", by hand-dipping in the resin compositions until the samples are thoroughly impregnated with the resin composition. The fibrous cellulosic sheets employed herein have a Gurley porosity of about 5 seconds using a 5 oz. cylinder and a ¼ sq. in. orifice.

The treated samples are dried at about 25° C. for 30 minutes and are then subjected to a temperature of about 170° C. for about 10 minutes. The cured samples can now be used as battery separators and are found to have picked up about 30% by weight of the resin composition. The samples are designated as A, B, C and D, corresponding to the resin compositions of Parts A, B, C and D of Example I.

As a control, the one-stage phenol-formaldehyde resin of Example I, Part A is used without any surface active agents to treat the same type of permeable cellulosic fibrous sheets as employed with resin compositions of Example I, Parts A, B, C and D and under the same conditions. These battery separators are designated as E.

Part B

The samples so prepared in Part A are completely immersed in a 14% hot (60° C.) aqueous sulphuric acid solution for about 30 minutes. The samples are removed and washed with copious amounts of running hot water at about 65° C. for about 1 hour. The samples are then dried at 177° C. for about 15 minutes.

To determine rewettability of the treated samples, they are gently floated on the surface of a 37% aqueous sulphuric acid solution until they are completely rewetted. Time of rewetting is measured with a stopwatch from the time the samples are floated on the surface of the acid solution until they are completely rewetted. The results are as follows:

TABLE I

| Sample: | Rewettability time |
|---|---|
| A | Instantaneous rewetting. |
| B | 30 seconds. |
| C | 8 seconds. |
| D | 10 minutes. |
| E | No wetting after 30 minutes. |

This example clearly shows that when cellulosic fibrous battery separators are prepared employing the resin composition of this invention, extremly fast rewetting of the battery separators is obtained with an acid solution comparable to that employed in the lead-acid batteries.

EXAMPLE III

This example is set forth to show the negative plate formation when employing battery separators A, B and C in assembling separate batteries containing these separators and prepasted gridplates. Since the rewetting of battery separators D and E are so poor they were not used in assembling batteries to determine the negative plate formation. The gridplates are the basis for the formation of the positive and the negative plates. The batteries are designated as Battery A, which contains battery separators A, Battery B, which contains battery separators B and Battery C, which contains battery separators C. Each battery is subjected to a steady charge of four (4) amperes for 41 hours. The positive plate is oxidized to lead dioxide and the negative plate is reduced to sponge lead. In general, the higher the metallic luster of the sponge lead upon scratching the surface thereof, the better the negative plate formation which in turn results in prolonged battery life and better battery performance. The results are visually observed as follows:

Battery A—lead formation on negative plate shows high metallic luster upon scratching the surface thereof.

Battery B—lead formation on negative plate shows good metallic luster upon scratching the surface thereof.

Battery C—lead formation on negative plate shows no metallic luster upon scratching the surface thereof and has profuse mottling indicating poor plate formation.

This invention is directed to a resin composition comprising in admixture a phenol-aldehyde resin and a combination of certain nonionic surface active agents. It has been surprisingly discovered that by employing the particular combination of surface active agents with a phenolaldehyde resin which composition is used to impregnate permeable cellulosic fibrous sheets to prepare battery separators therefrom, a synergistic effect is obtained which results in the battery separators having excellent rewettability and batteries employing these battery separators having excellent negative plate formation. These particularly desirable properties are shown by way of Example II, Table I and Example III. In particular, note the instantaneous rewettability of the battery separators impregnated with the composition of this invention. The examples also show that when either of the surface active agents are employed alone, there is a deficiency in either the rewettability time or the negative plate formation or both. Example II specifically shows that when the resin system of Example I, Part B, which has 2% of the water-insoluble surface active agent is used to impregnate battery separator plates, the separators have poor rewettability. When the separators are used to form the negative plate, the batteries do, however, have good negative plate formation as shown in Example III. The battery separators are deficient in rewettability time. In addition, Examples II and III show that when battery separators are impregnated with the resin system of Example I, Part C, which system has 4% of the water-insoluble active agent, the rewettability is very good, but the negative plate formation is very poor. Again there is a deficiency of one of the desirable properties. Therefore, the combination of a water-soluble and water-insoluble nonionic surface active agent with a phenol-aldehyde resin and the use of this composition to impregnate permeable cellulosic fibrous sheets for preparing battery separators therefrom, constitutes an improvement over the art and over that which is known and conventionally employed in preparing cellulosic battery separators.

As stated previously, the combination of wetting agents employed with the phenol-aldehyde resin comprises a water-soluble and a water-insoluble nonionic surface active agent. The water-insoluble nonionic surface active agent is one prepared by the condensation reaction of ethylene oxide with a polyoxypropylene base. This particular product is fully described in U.S. Patent 2,674,619 and is herein incorporated by reference. The polyoxypropylene portion of the water-insoluble nonionic surface active agent should be at least 40% by weight and, preferably, at least 80% by weight of the condensation reaction product and, correspondingly, the ethylene oxide units should be up to 60% and, preferably, up to 20% by weight thereof. In some cases it may even be desirable to employ only the polyoxypropylene base compound without having ethylene oxide units condensed therewith. It is to be further noted that although this surface active agent is water-insoluble, it is soluble in the aqueous phenol-aldehyde resin.

In the practice of this invention, the water-insoluble surface active agents as set forth in U.S. 2,674,619 should also have a number average molecular weight of about 500 to about 10,000 and, preferably, 1500–6000. The number average molecular weight range of the water-insoluble surface active agents employed herein is set forth merely for convenience and to show the practical range for allowing ease of application of the resin composition for impregnating a cellulosic fibrous sheet so as to insure thorough impregnation thereof. It is conceivable, therefore, that a surface active agent having a number average molecular weight of 25,000 may possibly be used in the application of impregnating a cellulosic fibrous sheet.

The water-soluble nonionic surface active agent employed in the practice of this invention is an alkyl phenol-ethylene oxide condensate. The alkyl group of the water-soluble nonionic surface active agent contains 8–12 carbon atoms and, preferably, 9 carbon atoms. The particular water-soluble active agents are generally known by the trade name Sterox NJ and Sterox NL and are manufactured by the Monsanto Chemical Company.

Any phenol-aldehyde resin may be employed in the practice of this invention. Particularly useful, however, are the phenol-formaldehyde resins which are generally prepared by the condensation reaction of about 0.5–3.0 mols of formaldehyde per mol of phenol in the presence of appropriate catalysts. The phenol-formaldehyde resins may be either a one-stage resin recovered in water, a one-stage resin recovered in a water-organic solvent or a liquid novolac two-stage resin having water associated with it. The preparation of these resins is generally well-known and the type of phenol-formaldehyde resin obtained depends upon the ratio of formaldehyde to phenol and the catalyst chosen for the reaction. As is well-known in the art, the catalyst employed in the reaction may be either acidic or basic in nature. The preferred phenol-aldehyde resin to be employed in the practice of this invention is a phenol-formaldehyde resin prepared by reacting 1.1–3.0 mols of formaldehyde per mol of phenol in the presence of an alkaline catalyst and wherein the reaction product is recovered in water. The phenol-formaldehyde resin employed in the practice of this invention should also have a water tolerance of 0.1 volume of water per equal volume of resin to greater than 50 volumes of water per volume of resin. However, as a practical limit, the water tolerance should be at least 5 volumes of water per one volume of resin.

Typical examples of other phenol-aldehyde resins which can be employed in the practice of this invention are resorcinol-formaldehyde, catechol-formaldehyde, phenol-acetaldehyde, and alkylated phenol-formaldehyde resins having an alkyl group containing 1–3 carbon atoms such as xylenol-formaldehyde, etc.

When employing the resin composition of this invention, the composition should consist of 90–99.9% by weight of the phenol-aldehyde resin and, correspondingly, 10–01% by weight of the combination of surface active agents. Preferably, the resin composition should consist of 95–99.5% by weight of the phenol-aldehyde resin and, correspondingly, 5–0.5% by weight of the combination of surface active agents.

The combination of water-soluble and water-soluble and water-insoluble nonionic surface active agents should be in the ratio of 30–65% by weight of the water-soluble agent and, correspondingly, 70–35% by weight of the water-insoluble agent. Preferably, the combination should consist of 45–55% and more particularly 50% by weight of the water-soluble agent and, correspondingly, 55–45% and more particularly 50% by weight of the water-insoluble agent.

This invention is also directed to a cellulosic fibrous permeable battery separator consisting of a permeable cellulosic fibrous sheet impregnated with the resin composition of this invention and wherein the phenol-aldehyde resin is advanced to the infusible state. The cellulosic fibrous battery separator of this type is generally prepared by first admixing the phenol-aldehyde resin and the combination of surface active agents. The surface active agents may be added either as 100% active materials or as a solution in a solvent compatible with the surface active agent and the phenol-aldehyde resin. The cellulosic fibrous sheet is then treated with the composition of this invention by either the wet-web saturation method or the dry-web method. In either method, it may be desirable to dilute the resin composition in order to obtain the desired pickup. The treated cellulose sheet is dried to remove excess solvent and is then subjected to a temperature of about 200° F. to about 600° F. in order to advance the phenol-aldehyde resin to an infusible state. The time of exposure of the treated cellulosic fibrous sheet to these temperatures will vary from approximately 30 minutes at 200° F. to at least one minute at 600° F. In addition, the cellulosic fibrous battery separator is generally ribbed to increase its resistance to degradation during use thereof in a lead-acid battery. Generally, it is also desirable to impregnate the cellulosic fibrous sheet with about 20–50 weight percent of the resin composition of this invention.

Alternatively, the cellulosic fibrous sheet may be first treated with the phenol-aldehyde resin alone, and secondly, in a separate operation, treating the cellulosic fibrous sheet with the surface active agents either before or after subjecting the phenol-aldehyde treated fibrous sheet to the elevated temperatures.

Although the preferred battery separator employed in the practice of this invention is a cellulosic fibrous permeable structure having a Gurley porosity of about 1–25 seconds when using a 5 oz. cylinder and a ¼ sq. in. orifice, other battery separator structures may be prepared by either incorporating the resin composition of this invention or just the surface active agent along. For example, the resin composition may be used to bind and coat battery separators prepared from glass fibers or diatomaceous earth or combinations of both with or without cellulosic fibers. In addition, the surface active agents alone may be incorporated in polyvinyl chloride separators, hard rubber separators or other materials wherein speedy re-wettability by the battery acid solution is desired.

The advantages of this invention are found in that the battery separators employing the resin composition of this invention are rapidly rewetted by the battery acid solution. The electrical resistance of the battery separator rapidly reaches its minimum value well within 10 minutes after addition of the battery acid to the battery. This advantage allows almost immediate use of the so-called "dry charge" lead-acid battery without injuring the battery separators or the battery itself. In addition, and negative plate formation is obtained when assembling batteries employing battery separators impregnated with the resin composition of this invention.

It will thus be seen that the objects set forth above, among those made apparent from the description, are efficiently attained, and since changes may be made in carrying out the above process and in the composition set forth without departing from the scope of this invention, it is intended that all matters contained in the above description shall be interpreted as illustrative and not in a limiting sense.

What is claimed is:

1. A resin composition consisting of in admixture 90–99.9 weight percent of a phenol-aldehyde resin and 10–0.1 weight percent of a combination of nonionic surface active agents wherein the combination consists of 30–65 weight percent of an alkyl phenol-ethylene oxide condensate having an alkyl group of 8–12 carbon atoms and 70–35 weight percent of the condensation reaction product of a polyoxypropylene base and ethylene oxide wherein the condensation product contains up to 60 weight percent of ethylene oxide and at least 40 weight percent of a polyoxypropylene base.

2. The resin composition of claim 1 wherein the admixture consists of 95–99.5 weight percent of the phenol-aldehyde resin and, correspondingly, 5–0.5 weight percent of the combination of nonionic surface active agents.

3. The resin composition of claim 2 wherein combination of nonionic surface active agents consists of 45–55 weight percent of the condensation reaction product of a polyoxypropylene base and ethylene oxide and, correspondingly, 55–45 weight percent of the alkyl phenol-ethylene oxide.

4. The composition of claim 2 wherein the phenol-aldehyde is a phenol-formaldehyde condensation reaction product of 1.1–3.0 mols of formaldehyde per mol of phenol.

5. The composition of claim 1 wherein the condensation reaction product of a polyoxypropylene base and ethylene oxide consists of at least 80 weight percent of a polyoxypropylene base and, correspondingly, up to 20 weight percent ethylene oxide.

References Cited by the Examiner

UNITED STATES PATENTS

| | | | |
|---|---|---|---|
| 2,181,891 | 12/1939 | Hazell | 136—146 |
| 2,213,477 | 9/1940 | Steindorff et al. | 260—613 |
| 2,454,541 | 11/1948 | Bock et al. | 260—53 |
| 2,458,796 | 1/1949 | Ott et al. | 260—831 |
| 2,482,062 | 9/1949 | Hanson | 136—146 |
| 2,521,911 | 9/1950 | Greenlee | 260—831 |
| 2,577,773 | 12/1951 | Lambert | 260—152 |
| 2,773,114 | 12/1956 | McAuslan | 136—146 |
| 2,872,497 | 2/1959 | Beckvold et al. | 136—146 |
| 2,887,552 | 5/1959 | MacKenzie | 136—33 |
| 3,156,655 | 11/1964 | Bright | 252—109 |

OTHER REFERENCES

Manufacturing Chemist, March 1952, pp. 99–101, copy in 252.

Non-Ionic Digest (Supel).

WILLIAM H. SHORT, *Primary Examiner.*

MURRAY TILLMAN, *Examiner.*

J. C. BLEUTGE, H. E. SCHAIN, *Assistant Examiners.*